(12) United States Patent
Shim et al.

(10) Patent No.: US 11,841,996 B2
(45) Date of Patent: Dec. 12, 2023

(54) DISPLAY APPARATUS INCLUDING AN INPUT DEVICE AND A PLURALITY OF ANTENNA MODULES, DISPLAY SYSTEM, AND CONTROL METHOD THEREOF

(71) Applicant: SAMSUNG ELECTRONICS CO., LTD., Suwon-si (KR)

(72) Inventors: Hui Jun Shim, Suwon-si (KR); Gwan-Hyung Kim, Suwon-si (KR); Gyeong Gu Kim, Suwon-si (KR); Sang Ho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 16/962,667

(22) PCT Filed: Jan. 16, 2019

(86) PCT No.: PCT/KR2019/000638
§ 371 (c)(1),
(2) Date: Jul. 16, 2020

(87) PCT Pub. No.: WO2019/143122
PCT Pub. Date: Jul. 25, 2019

(65) Prior Publication Data
US 2020/0371606 A1    Nov. 26, 2020

(30) Foreign Application Priority Data

Jan. 16, 2018   (KR) ......................... 10-2018-0005436

(51) Int. Cl.
*G06F 3/0346*    (2013.01)
*G01S 13/48*    (2006.01)
*G01S 13/46*    (2006.01)

(52) U.S. Cl.
CPC ............ *G06F 3/0346* (2013.01); *G01S 13/48* (2013.01); *G01S 2013/468* (2013.01)

(58) Field of Classification Search
None
See application file for complete search history.

(56) References Cited

U.S. PATENT DOCUMENTS 5,900,863 A * 5/1999 Numazaki ............... G06F 3/011
345/157
6,124,804 A * 9/2000 Kitao ..................... G08C 19/28
398/1
(Continued)

FOREIGN PATENT DOCUMENTS

CN    106200888 A * 12/2016
GB    2062228 A  * 5/1981 ............. G01B 17/00
(Continued)

OTHER PUBLICATIONS

Notice of Preliminary Rejection dated Feb. 14, 2022 in KR Application No. 10-2018-0005436 and English-language translation.
(Continued)

*Primary Examiner* — Kirk W Hermann
(74) *Attorney, Agent, or Firm* — Nixon & Vanderhye, P.C.

(57) ABSTRACT

An example display system includes: a display; an input device configured to transmit an initial position signal; a plurality of antenna modules configured to transmit a position detection signal, receive a reflection signal of the position detection signal that is reflected from the input device and a surrounding object, and receive the initial position signal transmitted from the input device; and a controller configured to perform control to cause a pointer to
(Continued)

be displayed on the display based on a position of the input device according to the received initial position signal and the reflection signal.

9 Claims, 15 Drawing Sheets

(56) References Cited

U.S. PATENT DOCUMENTS

| | | | | |
|---|---|---|---|---|
| 2004/0157558 | A1* | 8/2004 | Ishiwatari | H04B 1/202 455/39 |
| 2009/0128489 | A1* | 5/2009 | Liberty | G06F 3/0346 345/158 |
| 2010/0231513 | A1* | 9/2010 | Deliwala | G01S 5/163 345/158 |
| 2010/0253623 | A1* | 10/2010 | Wei | H04N 21/44218 345/158 |
| 2012/0256735 | A1* | 10/2012 | Gilson | G08C 19/16 340/12.23 |
| 2013/0265188 | A1* | 10/2013 | Yamabayashi | G01S 1/685 342/125 |
| 2014/0172373 | A1* | 6/2014 | Edwards | G06F 3/011 702/189 |
| 2014/0285475 | A1* | 9/2014 | Ogata | G06F 3/041 345/175 |
| 2015/0023138 | A1* | 1/2015 | Liu | G01S 3/808 367/124 |
| 2015/0177374 | A1* | 6/2015 | Driscoll | H01Q 3/26 342/22 |
| 2015/0249819 | A1* | 9/2015 | Jiang | G06F 3/0386 345/419 |
| 2015/0312719 | A1* | 10/2015 | Cho | G01S 5/0263 455/456.1 |
| 2016/0062488 | A1* | 3/2016 | Zhao | G06F 3/03542 345/163 |
| 2017/0229008 | A1* | 8/2017 | Frusciano | H04N 21/4221 |
| 2018/0149753 | A1* | 5/2018 | Shin | G01S 7/4811 |
| 2019/0113966 | A1* | 4/2019 | Connellan | G01S 5/16 |

FOREIGN PATENT DOCUMENTS

| | | | |
|---|---|---|---|
| JP | 2010165028 A | * | 7/2010 |
| KR | 10-2009-0066367 | | 6/2009 |
| KR | 100900978 B1 | * | 6/2009 |
| KR | 10-2010-0113251 | | 10/2010 |
| KR | 20110083115 A | * | 7/2011 |
| KR | 10-2013-0045222 | | 5/2013 |
| KR | 10-2014-0002911 | | 1/2014 |
| KR | 10-2015-0087960 | | 7/2015 |
| KR | 10-1549885 | | 9/2015 |

OTHER PUBLICATIONS

International Search Report for PCT/KR2019/000638, dated Apr. 25, 2019, 4 pages.
Written Opinion of the ISA for PCT/KR2019/000638, dated Apr. 25, 2019, 5 pages.

* cited by examiner

DISPLAY APPARATUS INCLUDING AN INPUT DEVICE AND A PLURALITY OF ANTENNA MODULES, DISPLAY SYSTEM, AND CONTROL METHOD THEREOF

This application is the U.S. national phase of International Application No. PCT/KR2019/000638 filed 16 Jan. 2019, which designated the U.S. and claims priority to KR Patent Application No. 10-2018-0005436 filed 16 Jan. 2018, the entire contents of each of which are hereby incorporated by reference.

FIELD

The disclosure relates to a display apparatus, a display system, and a control method thereof that are capable of accurately deriving the position of an input device with low power.

DESCRIPTION OF RELATED ART

Currently, a gyro-sensor, a camera gesture, a projected capacitive (P-Cap), an infrared (IR) touch, and a remote controller, and the like are used as an input device of a display.

The gyro-sensor enables a long-distance input, but has difficulty in recognizing absolute coordinates, and due to the high consumption, has a short usage time. In addition, the gyro-sensor itself is costly to be widely used.

The motion recognition technology disclosed in the related art patent document requires continuous transmission of a Tx signal from a remote controller, which leads to high power consumption and short usage time.

In addition, the camera gesture has been actively studied for long-distance input, but suffers from performance deterioration caused by illuminance and errors caused by background pictures or objects, and in order to identify the start and end of a motion, requires an additional motion. In addition, the camera gesture is easily hacked, which frequently leads to privacy infringement.

In addition, the touch input using infrared or P-Cap, one of the most frequently used input devices these days, has a difficulty in a Z-axis response, that is, a long distance response, and with regard to contact with a panel, a tempered glass and a sensor film for protecting the panel, may cause an image quality deterioration. The infrared light method requires no additional sensor film, but has a disadvantage in terms of design due to a step present in a bezel.

In addition, the remote controller is suitable for viewing a video, but has difficult in including a large number of buttons, and due to inconvenience in moving a cursor, has difficulty in responding to various applications.

SUMMARY

One aspect of the disclosure provides a display apparatus, a display system, and a control method thereof that are capable of deriving the high-accuracy position of an input device without being affected by the surrounding environment using radar with enhanced power efficiency.

According to an aspect of the disclosure, there is provided a display system including: a display; an input device configured to transmit an initial position signal; a plurality of antenna modules configured to transmit a position detection signal, receive a reflection signal of the position detection signal that is reflected from the input device and a surrounding object, and receive the initial position signal transmitted from the input device; and a controller configured to perform control to cause a pointer to be displayed on the display based on a position of the input device according to the received initial position signal and the reflection signal.

The controller may be configured to: determine an initial position of the input device based on the initial position signal; and determine a current position of the input device by calculating distances to the input device from positions of the plurality of antennal modules based on the reflection signal reflected within a predetermined range of the initial position.

The input device may stop transmitting the initial position signal after transmitting the initial position signal for a predetermined time.

The controller may determine a current position of the input device based on the reflection signal that has a signal magnitude whose change amount exceeds a reference value.

When a user switches the input device to an On-state, the input device may transmit the initial position signal.

The input device may transmit the initial position signal having a frequency band that matches a frequency band of the position detection signal.

The controller may calculate distances to the input device from the plurality of antenna modules based on at least one of a time of arrival of the reflection signal reflected from the input device or an attenuation rate of the reflection signal.

The controller may determine a current position of the input device based on a reflection signal excluding the reflection signal reflected from the surrounding object by using a previous reflection signal received at a predetermined previous point of time and the reflection signal received at a current point of time.

The controller may determine the current position of the input device by applying a first weight to the previous reflection and applying a second weight to the reflection signal.

The controller may generate predicted position information based on the reflection signals received from a predetermined previous point of time to a current point of time, and determine a current position of the input device based on the predicted position information and the reflection signal.

The controller may stop determining the position of the input device when the position of the input device does not change for a predetermined period of time or a user switches the input device to an Off-state.

According to another aspect of the disclosure, there is provided a method of controlling a display system, the method including: transmitting, by an input device, an initial position signal; receiving, by a plurality of antenna modules, the initial position signal from the input device, and transmitting a position detection signal and receiving a reflection signal of the position detection that is reflected from the input device and a surrounding object; and displaying a pointer on a display based on a position of the input device according to the received initial position and the reflection signal.

The determining of a current position of the input device may include: determining an initial position of the input device based on the initial position signal; and determining a current position of the input device by calculating distances to the input device from positions of the plurality of antennal modules based on the reflection signal reflected within a predetermined range of the initial position.

The method may further include stopping, by the input device, transmitting the initial position signal after transmitting the initial position signal for a predetermined time.

The determining of the current position of the input device may include determining the current position of the input device based on the reflected signal, of which the amount of change in call size exceeds a reference value.

The method may further include transmitting the initial position signal in response to switching to an On-state by the user.

The transmitting of the initial position signal may include transmitting the initial position signal of a frequency band that matches that of the position detection signal.

The determining of the current position of the input device may include calculating distances to the input device from the plurality of antenna modules based on at least one of a time of arrival of the reflection signal reflected from the input device or an attenuation rate of the reflection signal.

The determining of the current position of the input device may include determining a current position of the input device based on a reflection signal excluding the reflection signal reflected from the surrounding object by using a previous reflection signal received at a predetermined previous point of time and the reflection signal received at a current point of time.

The determining of the current position of the input device may include determining the current position of the input device by applying a first weight to the previous reflection and applying a second weight to the reflection signal, wherein the second weight may be larger than the first weight.

The determining of the current position of the input device may include generating predicted position information based on the reflection signals received from a predetermined previous point of time to a current point of time, and determining the current position of the input device based on the predicted position information and the reflection signal.

The method may further include stopping determining the position of the input device when the position of the input device does not change for a predetermined period of time or a user switches the input device to an Off-state.

According to another aspect of the disclosure, there is provided a display apparatus including: a display; a plurality of antenna modules configured to transmit a position detection signal, receive a reflection signal of the position detection signal that is reflected from an input device and a surrounding object, and receive the initial position signal transmitted from the input device; and a controller configured to perform control to cause a pointer to be displayed on the display according to a current position of the input device determined based on the initial position signal and the reflection signal.

As is apparent from the above, the display apparatus, the display system, and the control method thereof can derive the high-accuracy position of an input device without being affected by the surrounding environment using radar based on enhanced power efficiency.

DETAILED DESCRIPTION OF EXAMPLE EMBODIMENTS

Figure 1:
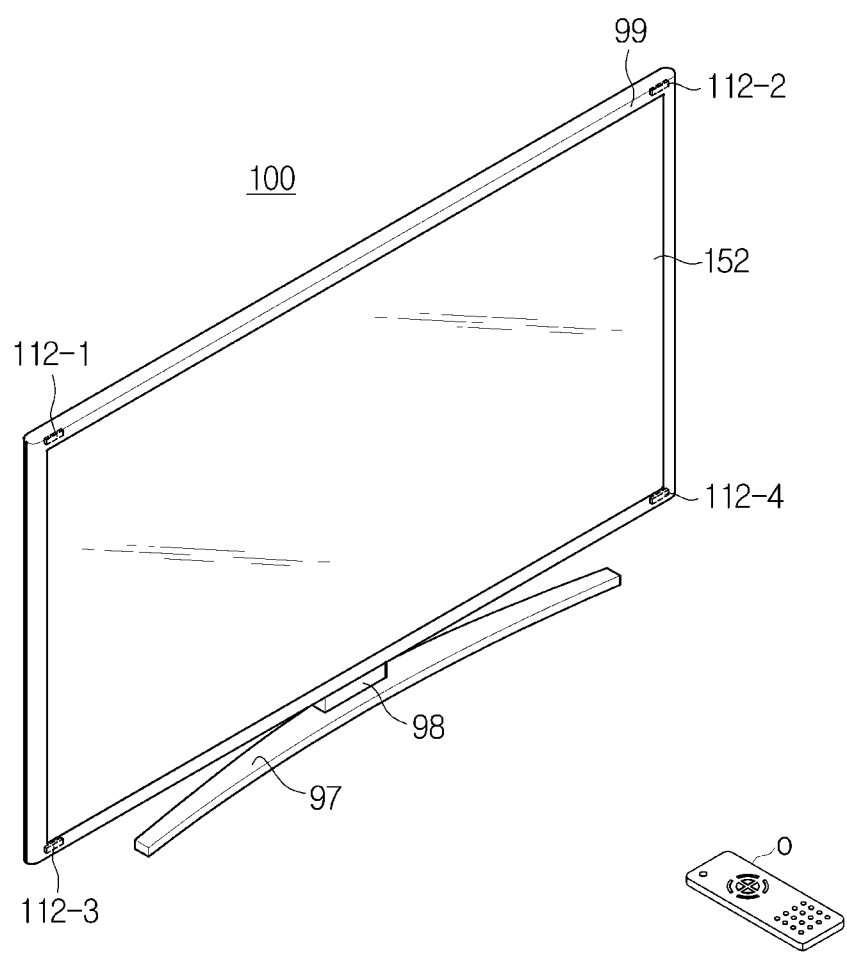
FIG. 1 is a view illustrating a display apparatus according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a layer is "on" another layer or substrate, the layer may be directly on another layer or substrate or a third layer may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a view illustrating a display apparatus according to an embodiment.

Referring to FIG. 1, a display apparatus 100 according to an embodiment may have an external appearance including an exterior housing 99, a display panel 152, a support 98, and a leg 97.

The exterior housing 99 forms the exterior of the display apparatus 100, and accommodates parts for allowing the display apparatus 100 to display various images or perform various functions. The exterior housing 99 may be formed in a unitary assembly, or may be formed of a plurality of housings, for example, a combination of a front housing and a rear housing. Inside the exterior housing 99, an intermediate housing may be further provided.

The display panel 152 may be installed on the front of the exterior housing 99 and may display various images to the outside. Specifically, the display panel 152 may display at least one of a still image or a moving image. The display panel 152 may be implemented using additional components, such as a touch panel, as needed.

The support 98 serves to connect the exterior housing 99 to the leg 97 while supporting the exterior housing 99. The support 98 may have various shapes depending on the designer's selection, and may be omitted as needed. The support 98 may be attached to or detached from the exterior housing 99 as needed. In addition, the display apparatus 100 may include at least one antenna 112-1 to 112-4.

The leg 97 may be connected to the support 98 and allow the exterior housing 99 to be stably mounted on the floor. The leg 97 may be coupled to or detached from the support 98 as needed. The leg 97 may also be directly connected to the exterior housing 99. The leg 97 may be omitted according to an embodiment.

Figure 2:
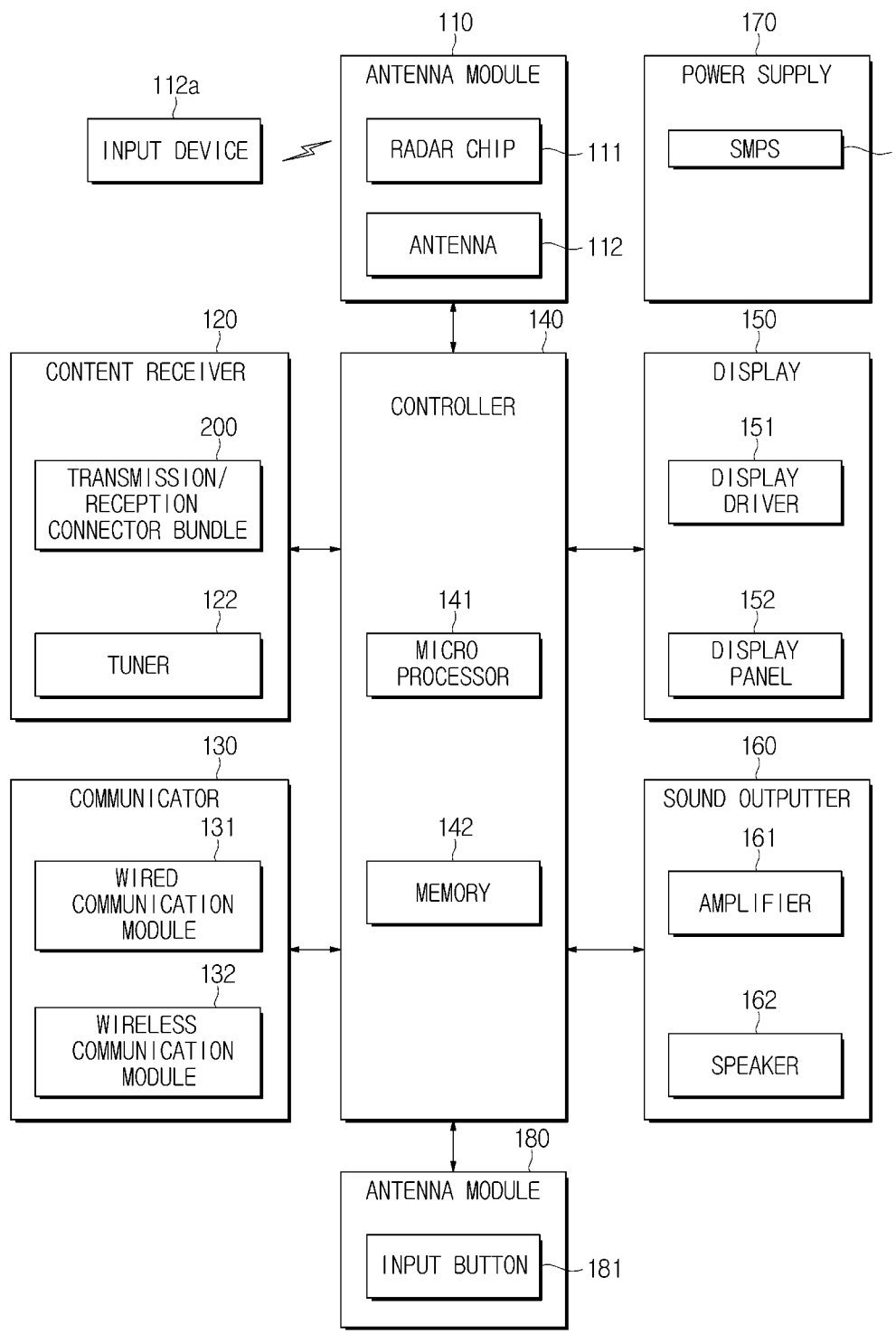
FIG. 2 is a control block diagram illustrating the disclosure according to an embodiment.

FIG. 2 is a control block diagram illustrating the disclosure according to an embodiment.

Referring to FIG. 2, the display apparatus 100 includes an antenna module 110 to receive a signal from an input device O, a user inputter 180 to receive a user's input from a user, a communicator 130 to communicate with an external device 130, a controller 140 to control the operation of the display apparatus 100 and process video signals and/or audio signals received from a content receiver 120 and/or the communicator 130, a display 150 to display an image processed by the controller 140, a sound outputter 160 to output sound processed by the controller 140, and a power supply 170 to supply power to the components of the display apparatus 100.

The antenna module 110 is a configuration capable of transmitting and receiving signals to and from the input device O, and may include three or more antennas 112 and a radar chip 111 to transmit and receive a signal composed of specific pulse components in a predetermined frequency band using the antenna. The antenna 112 may include a plurality of antennas 112-1, 112-2, 112-3, and 112-4 as described through the specification.

The antenna 112 may be connected to the input device O capable of transmitting or receiving a signal composed of specific pulse components in a predetermined frequency band and the controller 140 capable of performing a distance measurement and coordinate extraction using signals received from the radar chip 111.

The antenna module 110 may transmit a position detection signal. The position detection signal is a signal used for the display apparatus to determine the location of an input device or surrounding objects. According to the embodiment, the position detection signal may include a signal in a frequency band used by a radar. In addition, the antenna module 110 may receive a reflection signal of the position detection signal that is reflected from an input device or a surrounding object. The input device O that exchanges signals with the controller 140 may include a button for inputting a user's intention to start. The user may switch the input device O to an On-state by pressing the button. The input device O, switched to the On-state, may transmit an initial position signal to the display apparatus. The input device O may include a timer circuit capable of returning to an off-mode after a predetermined time.

The input device O includes an antenna for receiving a remote control signal. The input device O for receiving the user input may be provided separately from the display apparatus 100, and may receive a user input and transmit a wireless signal corresponding to the user input to the display apparatus 100. The antenna module 110 may receive the wireless signal corresponding to the user input from the input device O, and output an electrical signal corresponding to the user input to the controller 140.

The display apparatuses 100 may share one input device O, and a user input inputted to the input device O may be transmitted to all of the display apparatuses 100. The display apparatus 100 may receive a user input regarding a change of an image source device 20 or 30 through the antenna 112.

The controller 140 may perform control to receive the initial position signal transmitted by the input device and the reflection signal reflected from the input device or surrounding objects through the antenna module 110. The initial position signal refers to a signal output by the input device O when a user inputs a command to the display apparatus using the input device O. In addition, the controller 140 may determine the position of the input device at a start point of time based on the initial position signal. The controller 140 may determine the position of the input device after the start point of time based on the reflection signal.

The controller 140 may determine the position of the input device at the start point of time based on the initial position signal. The controller 140 may determine the position of the input device after the start point of time by calculating the distances from a plurality of the antenna modules to the input device based on the reflection signal reflected from the input device. Detailed operations thereof will be described below.

The input device O, after transmitting the initial position signal at the start time, may not transmit the signal. The display apparatus may determine the position of the input device O by receiving a reflection signal of the signal transmitted by the antenna module 110 after the start point of time.

The controller 140 may display a pointer corresponding to the position of the input device on the display. The shape of the pointer is not limited.

The controller 140 derives a change amount of the reflection signal reflected from the surrounding object, and when the change amount of the reflection signal is less than a predetermined value, the controller 140 may determine the surrounding object as a fixed object. Detailed operations thereof will be described below.

The controller 140 may derive the distance from the display to the input device based on the time of arrival of the reflection signal reflected from the input device.

The controller 140 may generate previous position information of the surrounding object based on a reflection signal reflected from the surrounding object received at a certain point of time, that is, a previous point of time, and may generate current position information of the surrounding object based on a reflection signal reflected from the surrounding object at a current point of point of time after the previous point of time.

The controller 140 may determine the position of the input device O by synthesizing the reflection signal of the above described position derivation signal that is reflected from the input device with the current position information and the previous position information. In addition, the previous position information and the current position information may be assigned different weights. The detailed operation of assigning weights to identify the position of the input device O will be described below.

The controller 140 may generate predicted position information of the input device after the current point of time based on the reflection signal reflected from the input device and the surrounding object.

In addition, the position of the input device O may be determined by synthesizing the predicted position information and the current position of the input device.

The controller 140 may stop determining the position of the input device when the position of the input device does not change for a predetermined period of time or when the user switches the input device to an off-state.

The controller 140 may process image frame data and/or video/audio signals received by the content receiver 120 and/or the communicator 130. For example, the controller 140 may output image frame data received from the content receiver 120 to the display 150. In addition, the controller 140 may process the video/audio signals received by the content receiver 120 and/or the communicator 130, and output image frame data generated from the video/audio signals to the display 150.

The controller 140 may control the operations of the content receiver 120, the display 150, and the sound outputter 160 according to the operation state of the display apparatus 100 and/or a user input. For example, when a content source is selected by a user input, the controller 140 may control the content receiver 120 to receive image frame data from the selected content source. In addition, when the image frame data is not received through the content receiver 120, the controller 140 may control the content receiver 120 to receive image frame data from another content source.

In particular, the controller 140 may output a selection signal for selecting a source from which to receive image frame data to a transmission/reception connector bundle 200 of the content receiver 120. The controller 140 may include a microprocessor 141 and a memory 142.

The memory 142 may store programs and data for processing image frame data and/or video/audio signals, and may temporarily memorize data generated during processing of the image frame data and/or video/audio signals. In addition, the memory 142 may store programs and data for controlling the components included in the display apparatus 100 and temporarily memorize data generated during the control of the components included in the display apparatus 100.

The memory 142 may include a non-volatile memory for storing data for a long time, such as a read only memory (ROM) and a flash memory, and a volatile memory for temporarily memorizing data, such as a static random access memory (S-RAM), Dynamic Random Access Memory (D-RAM).

The microprocessor 141 may receive image frame data and/or video/audio signals from the content receiver 120 and/or the communicator 130. The microprocessor 141 may output the image frame data received from the content receiver 120 to the display 150 and the sound outputter 160. In addition, the microprocessor 141 may decode the video signal to generate image frame data, decode the audio signal to generate sound data, and output the image frame data and sound data to the display 150 and the sound outputter 160, respectively.

The microprocessor 141 receives a user input from the user inputter 180, and controls a control signal for controlling the content receiver 120 and/or the display 150 and/or the sound outputter 160 according to the user input. In addition, the microprocessor 141 may generate a control signal for controlling the operation of the content receiver 120 according to whether image frame data is received through the content receiver 120.

The microprocessor 141 may include an arithmetic circuit that performs logical operations and arithmetic operations, and a memory circuit that memorizes calculated data.

The controller 140 may convert sound data decoded from the audio signal into an analog acoustic signal, and an amplifier 161 may amplify the analog sound signal output from the controller 140.

The user inputter 180 may include an input button group 181 that receives a user input.

For example, the user inputter 180 may include a power button for turning on or off the display apparatus 100, a channel selection button for selecting broadcast content displayed on the display apparatus 100, a sound control button for adjusting the volume of the sound output from the display apparatus 100, a source selection button for selecting a content source, and the like.

The input button group 181 may receive respective user inputs and output electrical signals corresponding to the user inputs to the controller 140. The input button group may be implemented using various input devices, such as a push switch, a touch switch, a dial, a slide switch, a toggle switch, and the like.

The tuner 122 may receive a broadcast signal from a broadcast reception antenna or a wired cable, and extract a broadcast signal of a channel selected by a user from among the broadcast signals. For example, the tuner 122 may pass a broadcast signal having a frequency corresponding to a channel selected by a user among a plurality of broadcast signals received through the broadcast reception antenna or the wired cable, and block a broadcast signal having a different frequency.

As such, the content receiver 120 may receive image frame data and/or video/audio signals through the transmission/reception connector bundle 200 and/or the tuner 122, and output the image frame data and/or video/audio signals received through the transmission/reception connector bundle 200 and/or the tuner 122 to the controller 140.

The communicator 130 may include a wired communication module 131 and a wireless communication module 132 that may exchange data with external devices.

The wired communication module 131 may be connected to a communication network through a cable and exchange data with an external device through the communication network. For example, the wired communication module 131 is connected to a communication network through Ethernet (Ethernet, IEEE 802.3 technology standard), and exchanges data with first and second image source devices 20 and 30 and/or external devices through the communication network.

The wireless communication module 132 may wirelessly communicate with an access point (AP), and connect to a communication network through the AP and exchange data with the first and second image source devices 20 and 30 and/or the external devices through the communication network. For example, the wireless communication module 132 may communicate with the AP through Wi-Fi (WiFi™ IEEE 802.11 technology standard), Bluetooth (Bluetooth™, IEEE 802.15.1 technology standard), ZigBee™ (IEEE 802.15.4 technology standard). The wireless communication module 132 may exchange data with an external device through the AP.

The communicator 130 may receive image frame data through the communication network.

The display 150 includes a display panel 152 for visually displaying an image, and a display driver 151 for driving the display panel 152.

The display panel 152 may generate an image according to image data received from the display driver 151 and display the image.

The display panel 152 may include a pixel that serves as a unit for displaying an image. Each pixel may receive an electrical signal representing an image from the display driver 151, and output an optical signal corresponding to the received electrical signal. As such, optical signals output from a plurality of the pixels are combined so that one image may be displayed on the display panel 152.

The display driver 151 may receive image data from the controller 140 and drive the display panel 152 to display an image corresponding to the received image data. Specifically, the display driver 151 may transmit an electrical signal corresponding to image data to each of a plurality of pixels constituting the display panel 152.

When the display driver 151 transmits an electrical signal corresponding to image data to each pixel constituting the display panel 152, each pixel outputs light corresponding to the received electrical signal, and light output from each pixel is combined to form an image.

The sound outputter 160 includes the amplifier 161 for amplifying sound, and a speaker 162 for acoustically outputting the amplified sound.

The speaker 162 may convert the analog acoustic signal amplified by the amplifier 181 into sound (a sound wave). For example, the speaker 182 may include a thin film that vibrates according to an electrical acoustic signal, and sound waves may be generated by the vibration of the thin film.

The power supply 170 may supply power to the user inputter 180, the content receiver 120, the communicator 130, the controller 140, the display 150, the sound outputter 160, and all other components.

The power supply 170 includes a switching mode power supply 171 (hereinafter, referred to as 'SMPS').

The SMPS 171 may include an AC-DC converter that converts AC power of an external power source into DC power, and a DC-DC converter that changes the voltage of the DC power. For example, AC power of an external power source is converted to DC power by the AC-DC converter, and the voltage of the DC power may be changed to various voltages (for example, 5V and/or 15V) by the DC-DC converter. The DC power with 변경 varying voltages may be supplied to the user inputter 180, the content receiver 120, the controller 140, the display 150, the sound outputter 160, and all other components.

In addition, the transmission/reception connector bundle 200 may include a switch part 230 for selecting source of image frame data.

At least one component may be added or omitted to correspond to the performances of the components of the display apparatus shown in FIG. 2. In addition, it would be understood by those skilled in the art that the mutual positions of the components may be changed to correspond to the performance or structure of the system.

Meanwhile, the components shown in FIG. 2 may refer to a software component and/or a hardware component, such as a Field Programmable Gate Array (FPGA) and an Application Specific Integrated Circuit (ASIC).

Figure 3:
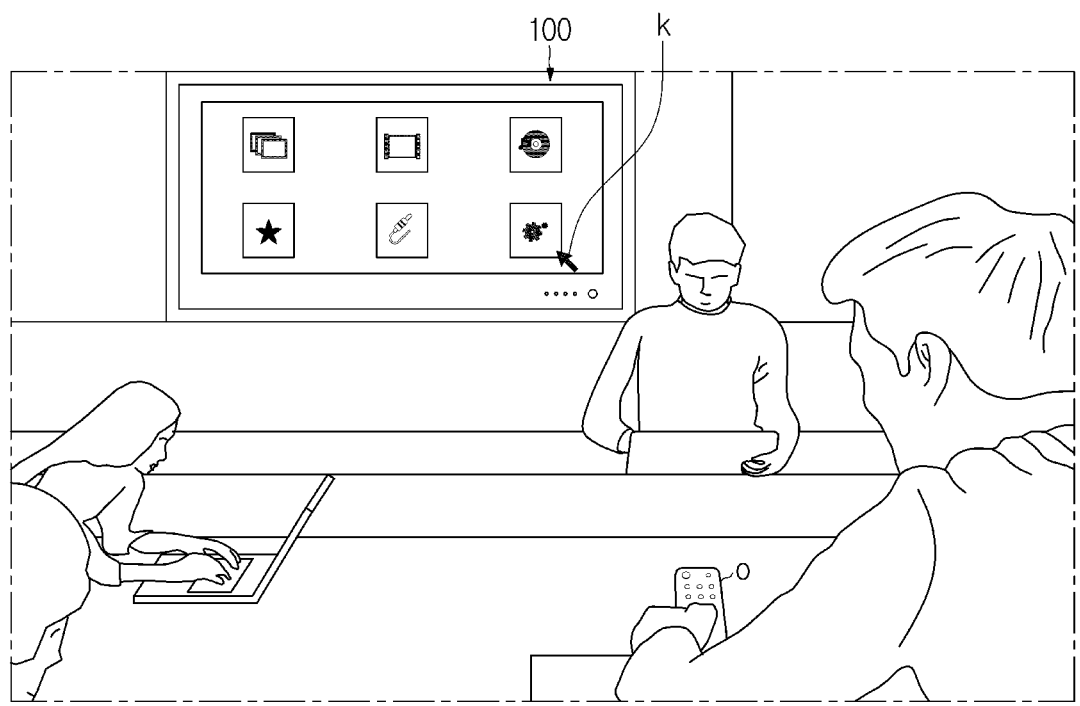
FIG. 3 is a view illustrating an aspect of using an input device according to an embodiment.

FIG. 3 is a view illustrating an aspect of using an input device according to an embodiment.

Referring to FIG. 3, the user may control the display apparatus using the input device O. The user may input various control commands of the display apparatus based on the position of the input device O. For example, the user may input an input signal based on the position of a pointer K displayed to correspond to the position of the input device O. That is, the display apparatus may output the pointer K that changes according to a position change of the input device to the display. As will be described below, the position of the input device O may be derived in various methods, and based on this, the pointer K may change the position thereof. However, according to the embodiment of the disclosure, the position of the input device O may be determined based on a radar signal of the antenna module 110 included in the display apparatus.

Hereinafter, an operation of accurately determining the position of the input device O according to an embodiment of the disclosure will be described in detail.

Figure 4A:
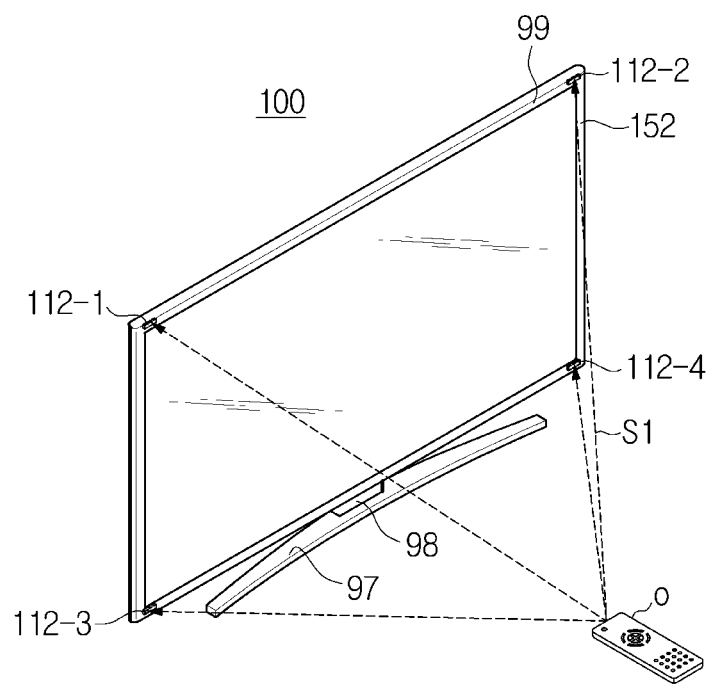
FIGS. 4A and 4B are views for describing an operation of deriving the initial position of an input device.
Figure 4B:
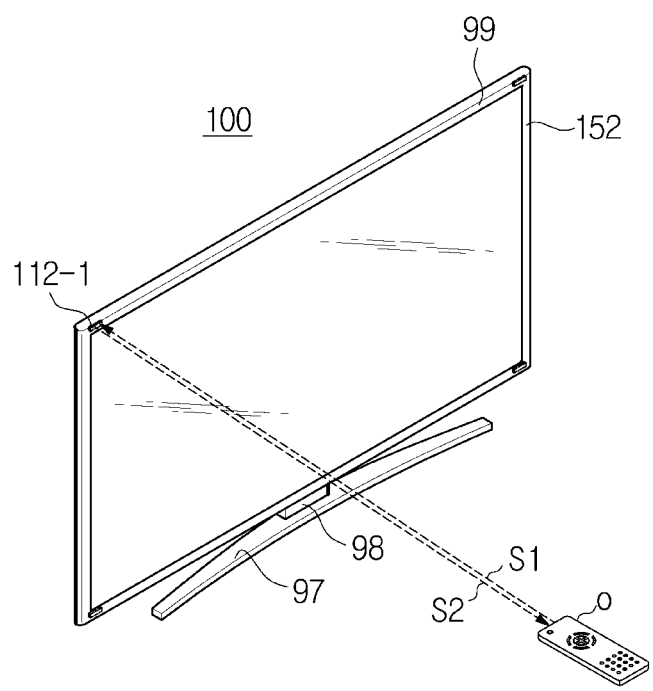

FIGS. 4A and 4B are a view for describing an operation of deriving the initial position of an input device O.

Referring to FIG. 4A, in the determining of the position of the input device, the input device O may transmit an initial position signal S1 to the display apparatus at a start point of time. The input device O may include a button that directly receives a user's command. The input device may sense a signal transmitted from the display apparatus and transmit a signal S1 in a frequency band corresponding to the signal. The predetermined frequency band represents the frequencies of a signal transmitted by the display apparatus, that is, the frequencies of a radar signal. As the frequency band, several MHz to GHz bands are available. In addition, in order to avoid confusion with signals transmitted from other electronic devices, the signal transmitted by the input device may include a waveform having a specific shape. The antenna module 110 of the display apparatus may distinguish signals through a relationship between the signal transmitted by the input device and a specific pulse component.

When the user switches the input device O to an On-state, the input device O may transmit an initial position signal S1 for deriving the position of the input device O. The initial position signal may include a specific pulse component of a predetermined frequency band that matches that of a signal generated by the antenna module 110 of the display apparatus.

On the other hand, the input device O may not include a button. When the display apparatus periodically transmits a signal composed of a specific pulse component of a predetermined frequency band, and the input device, upon receiving the signal, transmit a signal S1 having the specific pulse component of the predetermined frequency band transmitted by the antenna module 110 of the display apparatus. Since the signal S1 output through the input device O is a signal S1 transmitted directly by the input device, the signal is distinguish able from other signals.

Once the display apparatus determines the position of the input device at the starting point, the input device O may no longer transmit the initial position signal S1. No transmission of the initial position signal S1 by the input device O may be achieved by switching through re-input of a button. When there is no button in the input device O, the input device O may transmit the initial position signal a predetermined number of times in response to receiving a specific pulse signal of a predetermined frequency band from the antenna module, and stop transmission of the initial position signal. In addition, two types of input devices may stop transmission of the initial position signal after a predetermined time.

Referring to FIG. 4B, an operation of deriving the position of the input device O after the start point of time is described.

The antenna module 110 may transmit a position detection signal S2 and receive a signal S1 of the position detection signal that is reflected from the input device O. The controller 140 may continuously track the position of the input device O within an expected moving position based on the signal S1 reflected from the input device after being transmitted from the antenna module 110 and the initial position of the input device O. The initial position of the input device O, that is, the position of the input device O at the start point of time, may be obtained as 3D coordinates using the initial position of each antenna module 110 and the distance between the antenna module 110 and the input device. The input device is used by the user and may not be moved instantaneously. Therefore, when the controller determines the current position of the input device from the reflection signal based on the position detection signal, the controller may track the position of the input device by receiving the reflection signal within a predetermined range from the initial position.

The controller 140 continuously transmits a signal S2 of a specific pulse in a frequency band determined by the antenna module 110 itself after the start point of time, and uses a time to return of a signal after reflection, to measure the distance between the input device and each antenna module 110.

The controller 140 may receive the signal S1 received by the antenna module 110 at regular time intervals to determine the magnitude of the signal. Since the signal S1 received by the antenna module 110 has a predetermined propagation speed, the distance may be derived based on the time of arrival of the signal returning after being reflected at each distance. The controller 140 may' store the signal received by the antenna module 110 in the form of raw data. The controller 140 may calculate the distance between the input device and the display apparatus using the raw data.

The controller 140 may calculate the 3D position of the input device in real time using the distances from the plurality of antenna modules to the input device and the position of the antenna based on the reflection signal received by the antenna module 110. Detailed operation thereof will be described below.

Figure 5:
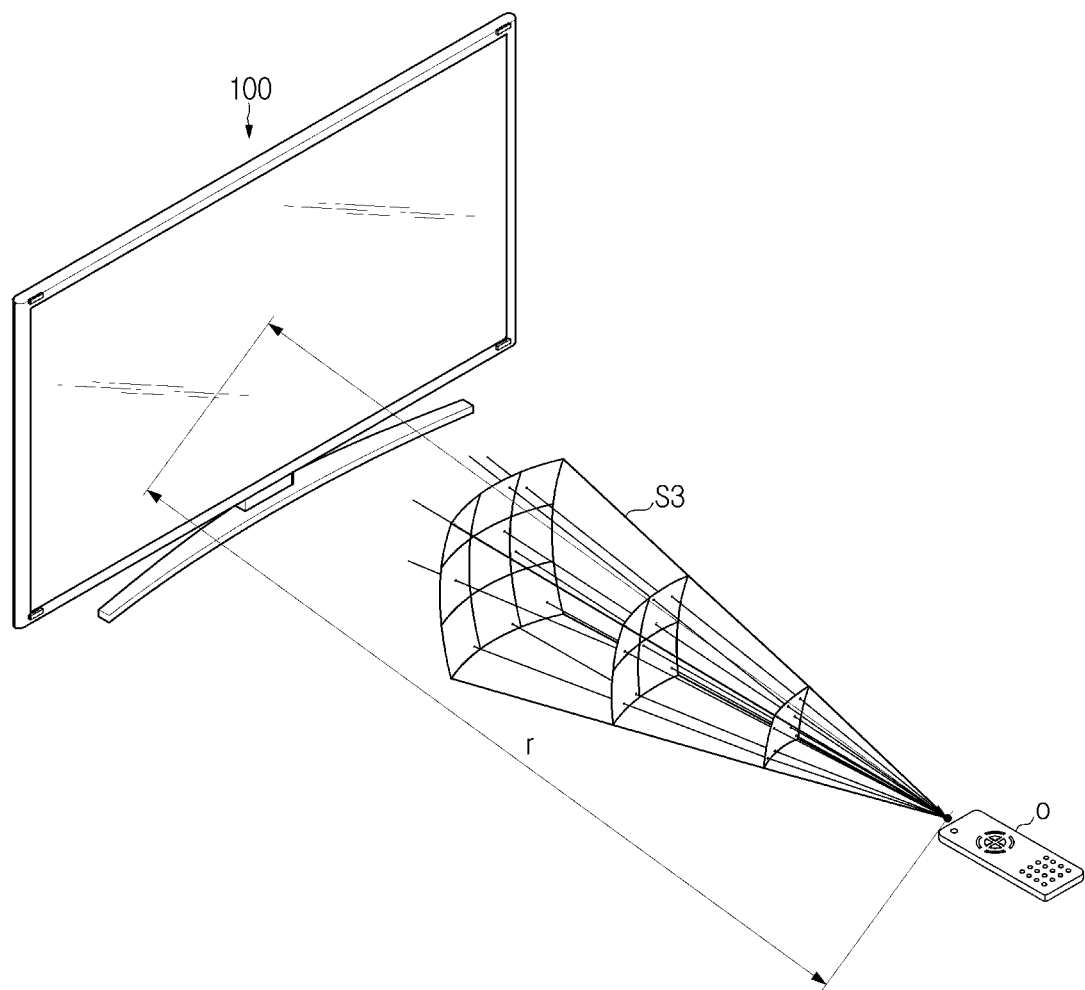
FIG. 5 is a view for describing an operation of deriving a distance between a display apparatus and an input device or a surrounding object based on the time of arrival of a signal.

FIG. 5 is a view for describing an operation of deriving a distance between a display apparatus and an input device or a surrounding object based on the time of arrival of a signal.

Referring to FIG. 5, an operation of deriving a distance between the display apparatus and the input device O is described. That is, the following description is made in relation to an operation of determining the distance to the input device when the display apparatus receives the initial position signal transmitted by the input device or the position detection signal returning after being reflected from the input device.

The antenna module 110 according to the embodiment may use a signal in a radar frequency domain. Using reflection of a signal that is reflected from an object, the radar may receive the reflection waves, and determine the position of a target based on the reflection waves.

The signal transmitted by the input device may be determined in advance. Since the signal transmitted by the antenna module and the signal reflected from the input device have no change in the speed of the signal itself, the relationship between the speed of the reflection signal S3 and the distance r may be expressed by Equation 1 below.

$$r = v \times t \qquad \text{[Equation 1]}$$

Referring to Equation 1, v denotes the speed of the signal S3 and r denotes the distance between the antenna included in the display apparatus and the input device. t denotes the time taken for the signal to arrive at the display apparatus.

The speed v of the signal transmitted by the input device and the position detection signal transmitted by the antenna module may be determined by the user in advance, and the time at which the signal is transmitted may also be determined by the display apparatus. The display apparatus may calculate the distance t between the input device O and the display apparatus by obtaining the time t for the signal to arrive at the display apparatus.

In addition, the strength of the signal S3 may be used to calculate the distance r between the plurality of antenna modules included in the display apparatus and the input device O. Since the strength and distance of the signal S3 are inversely proportional to each other, the controller 140 may determine that a weaker strength of the signal S3 received by the antenna module 110 represents a farther distance between the display apparatus and the input device. That is, the magnitude of the signal transmitted from the input device and the magnitude of the signal reflected from the input device may be determined in advance. In addition, since the strength of a wave decreases in inverse proportion to the square of the distance, the controller may measure the distance through an attenuation rate of the magnitude of the signal received by the plurality of antenna modules.

The above content may be used to calculate the position of the input device O, which will be described below.

Figure 6:
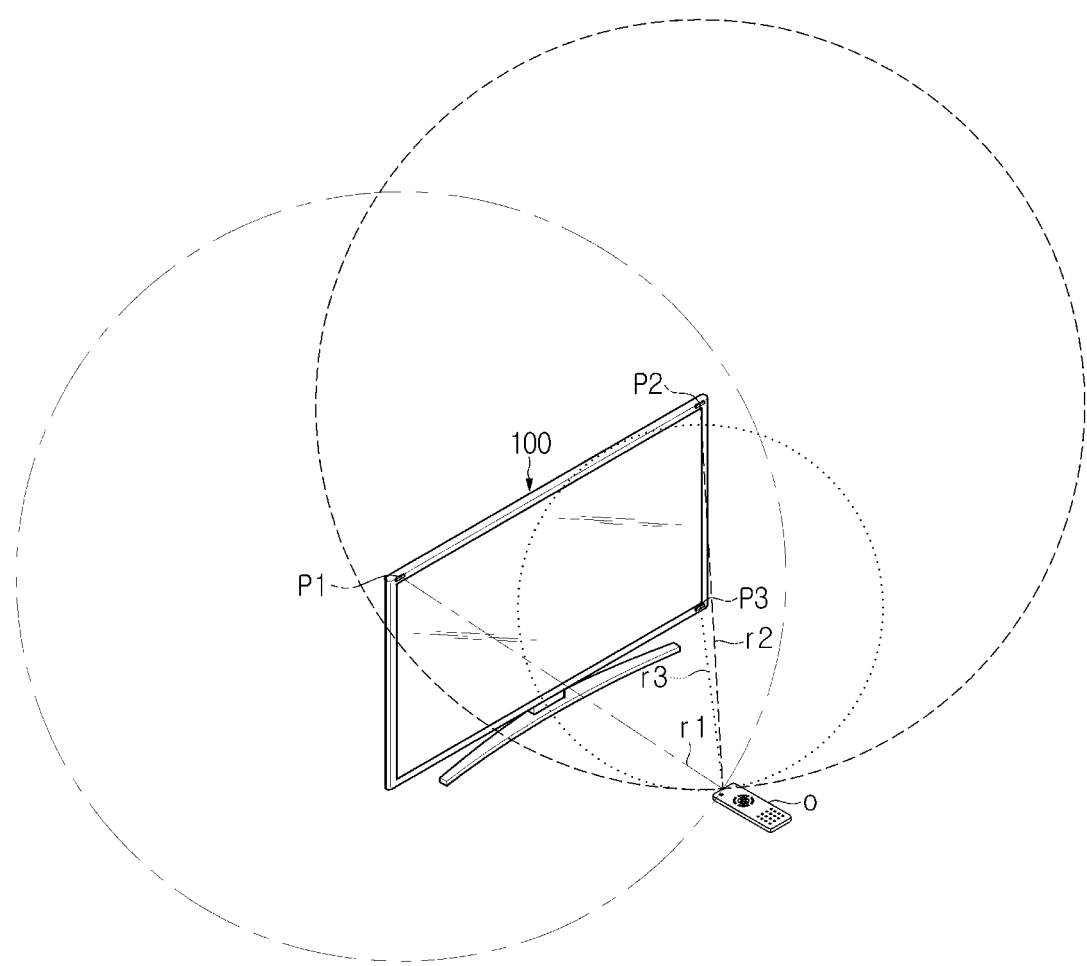
FIG. 6 is a view for describing an operation of deriving a position of an input device according to an embodiment.

FIG. 6 is a view for describing an operation of deriving a position of an input device according to an embodiment.

Referring to FIG. 6, the antenna module 110 may include at least three antennas. Assuming the coordinates of the respective antenna positions as p1(x1,y1,z1), p2(x2,y2,z2), and p3(x3,y3,z3), the distances from the respective antennas to the input device O are derived as r1, r2, and r3, equations of sphere may be derived as shown in Equation 2 below.

$$\begin{cases} (x-x1)^2 + (y-y1)^2 + (z-z1)^2 = r1^2 \\ (x-x2)^2 + (y-y2)^2 + (z-z2)^2 = r2^2 \\ (x-x3)^2 + (y-y3)^2 + (z-z3)^2 = r3^2 \end{cases} \qquad \text{[Equation 2]}$$

The three equations of sphere have one solution at the intersection. Accordingly, the controller 140 may determine x, y, and z coordinates calculated by solving the equations of sphere in Equation 1 as the position of the input device O. The controller may calculate the three-dimensional position coordinates of the input device O by obtaining the position coordinates of the plurality of antennas provided in the display apparatus and the distances from the antennas to the input device O.

Figure 7:
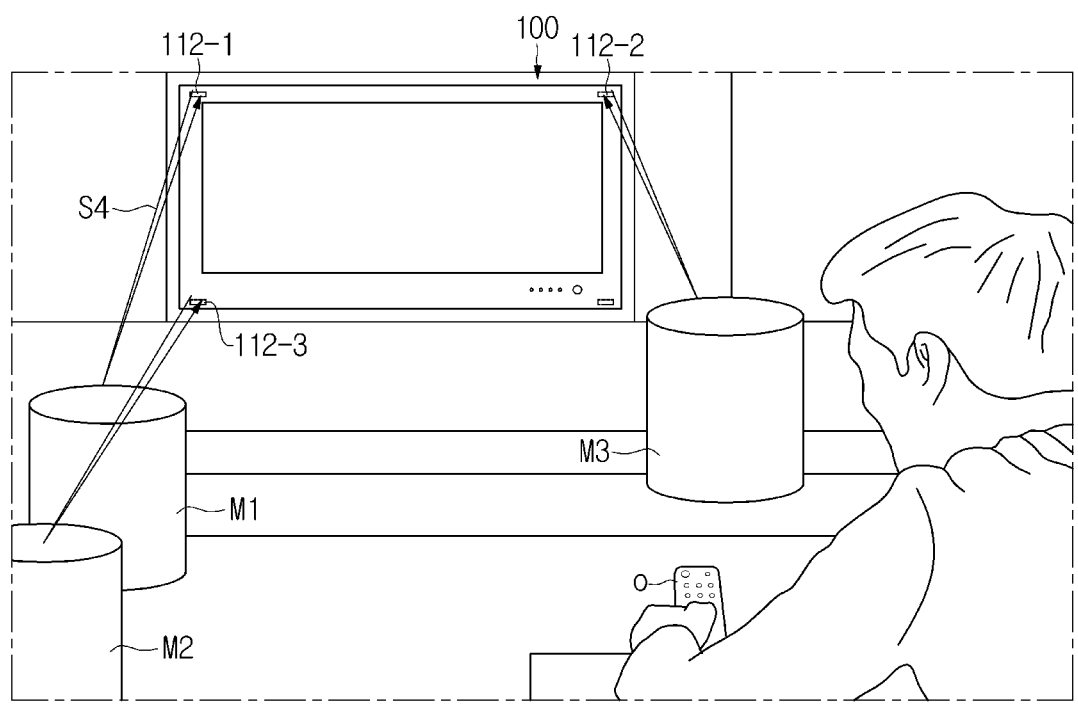
FIG. 7 is a view for describing an operation of determining a non-moving surrounding object according to an embodiment.

FIG. 7 is a view for describing an operation of determining a non-moving surrounding object according to an embodiment.

FIG. 7 is a view for describing an operation of determining a non-moving surrounding object according to an embodiment.

Referring to FIG. 7, the position of the input device O is more accurately determined. The controller 140 may store signals reflected in surrounding objects M1, M2, and M3. In consideration that a signal reflected by a fixed surrounding object has no change, the controller may remove the signal through differential operation. That is, the controller 140 may receive reflection signals S4 reflected by the surrounding objects M1, M2, and M3, derive change amounts of the received reflection signals S4, and determine a signal whose change amount is close to 0 as corresponding to a fixed surrounding object M1, M2, or M3. The signal may be ignored when calculating the position of the input device O.

In the determining of the position of the input device, the position of the input device needs to be derived based on reflection signals reflected from the input device, and reflection signals reflected from surrounding objects are considered noise.

When the reflection signal reflected from the surrounding object is ignored, the proportion of the reflection signals reflected from the input device in the signals received by the antenna module 110 increases, so that the controller 140 may more accurately derive the position of the input device.

Figure 8A:
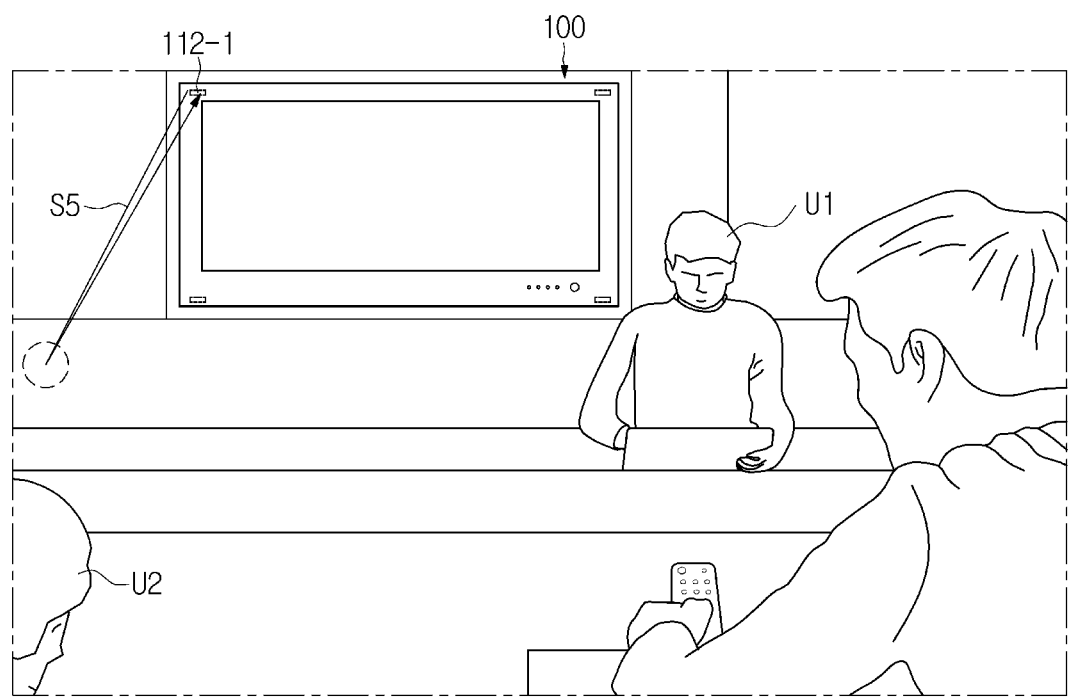
FIGS. 8A and 8B are views illustrating an operation of determining a moving surrounding object according to an embodiment.
Figure 8B:
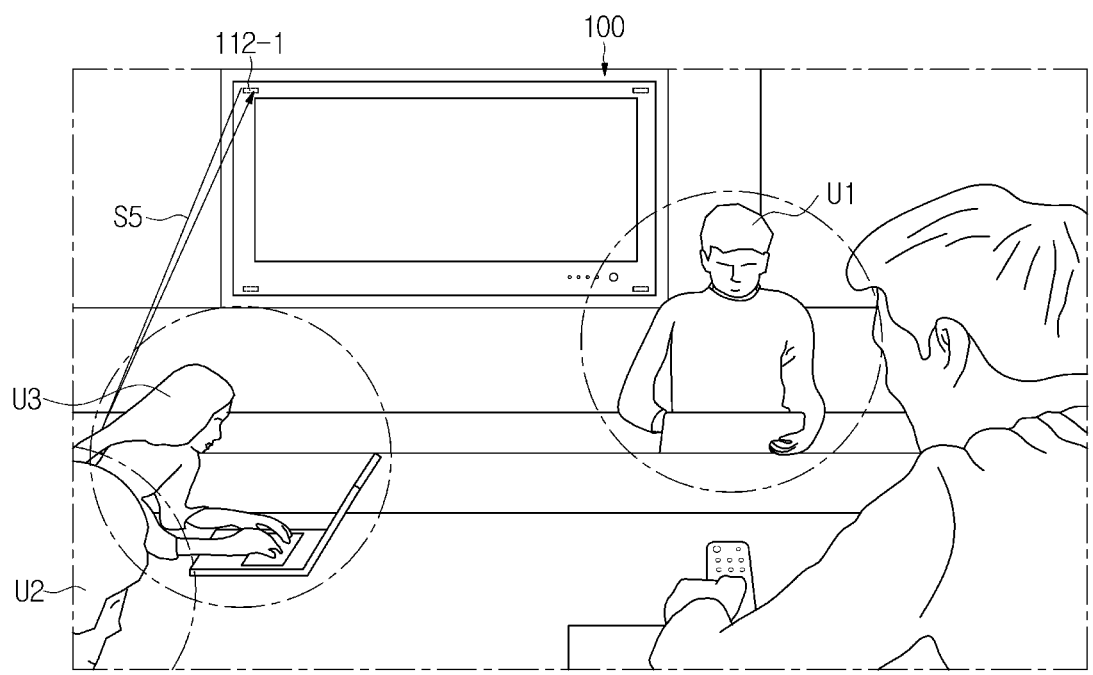

FIGS. 8A and 8B are views illustrating an operation of determining a moving surrounding object according to an embodiment.

FIG. 8A shows a case which a moving surrounding object does not exist, and FIG. 8B shows a case in which a moving surrounding object exists.

In order to more accurately derive the position of the input device O when moving surrounding objects U1, U2, and U3 around the display apparatus exist, the controller 140 cumulatively stores "a signal value with distance" of each antenna module in a memory, and averages the signal values to generate cumulative data for each antenna.

The controller 140 may compare the cumulative data stored in the storage after the start point of time with a newly received data value based on the cumulative data, and remove the reflection signal of the surrounding object using the difference between the two pieces of data.

$$D(t1)=A1 \cdot P(t1)-A2 \cdot P(t2)-A3 \cdot P(t3) \quad \text{[Equation 3]}$$

Referring to Equation 3, $D(t1)$ denotes data for determining the position of the input device O at the time t1, and $P(t1)$, $P(t2)$, and $P(t3)$ denote signals S5 received by the antenna module 110 at t1, t2, and t3. In addition, A1, A2 and A3 denote weights corresponding to pieces of information related to the time t1, t2, and t3, respectively. In Equation 3, the point of time close to the current point of time is set to t1, and t2 and t3 refer to the points of time before the current point of time. The controller 140 may assign position information corresponding to the time t1 with A1, which is a weight greater than A2, and assign position information corresponding to time t2 with A2, which is a weight greater than A3. That is, the position information at a time closer to the current time is assigned a higher weight to increase the proportion of the position information at the current time, and while the weight of the previous position information is lowered, the position information of the surrounding objects except for the input device is removed, so that the position of the input device O may be more accurately derived. The controller may derive the position information of the surrounding object in the above-described manner, and remove the reflection signal reflected from the surrounding object in determining the current position of the input device.

FIG. 8B shows a case in which a surrounding object U3 that does not exist in FIG. 8A has appeared. Assuming that FIG. 8B illustrates a case at the time t1 and FIG. 8A illustrates a case at the time t3, the change amount of a reflection signal S5 of the surrounding object becomes larger due to the movement of the surrounding object U3, and the corresponding signal may act as noise when the display apparatus detects the position of the input device O. However, position information at the time of t2, which is a point of time between t1 and t3, is further derived and removed, so that even with an existence of the reflection signal S5 reflected from the moving surrounding object U3, the position of the input device O may be accurately derived.

According to another embodiment, when storing signal values are stored in a memory except for a signal value of a surrounding object U3 that has moved between the power-on time point of the antenna module 110 and the controller 140 and the start time point or except for a signal value of a surrounding object after the start time point, the existing cumulative data value may be assigned a high weight (for example, 0.7 to 0.99) and newly received data may be assigned a low weight (for example, 0.3 to 0.1), thereby removing the influence of the surrounding objects.

According to another embodiment, when the movement of the surrounding object is large, all the newly received values may be assigned a low weight (for example, 0.3 to 0.01) and added rather than excluding the signal value of the surrounding object, so that the signal of the fixed surrounding object is removed and the signal of the moving surrounding object does not affect the cumulative data, so that the position of the input device O may be accurately derived.

The speed of the moving surrounding objects U1, U2, and U3 may be calculated through Doppler effect. The controller may remove data of a part having a moving surrounding object, and accumulate and store information about a fixed surrounding object in a memory. The speed of surrounding objects may also be calculated using the position change amount of the peak point per hour rather than using the Doppler effect.

Meanwhile, the operation described in FIG. 8 is only one embodiment for more accurately deriving the position of the input device O when the surrounding object moves, and the method of removing the signal reflected from the surrounding object is not limited thereto.

Figure 9:
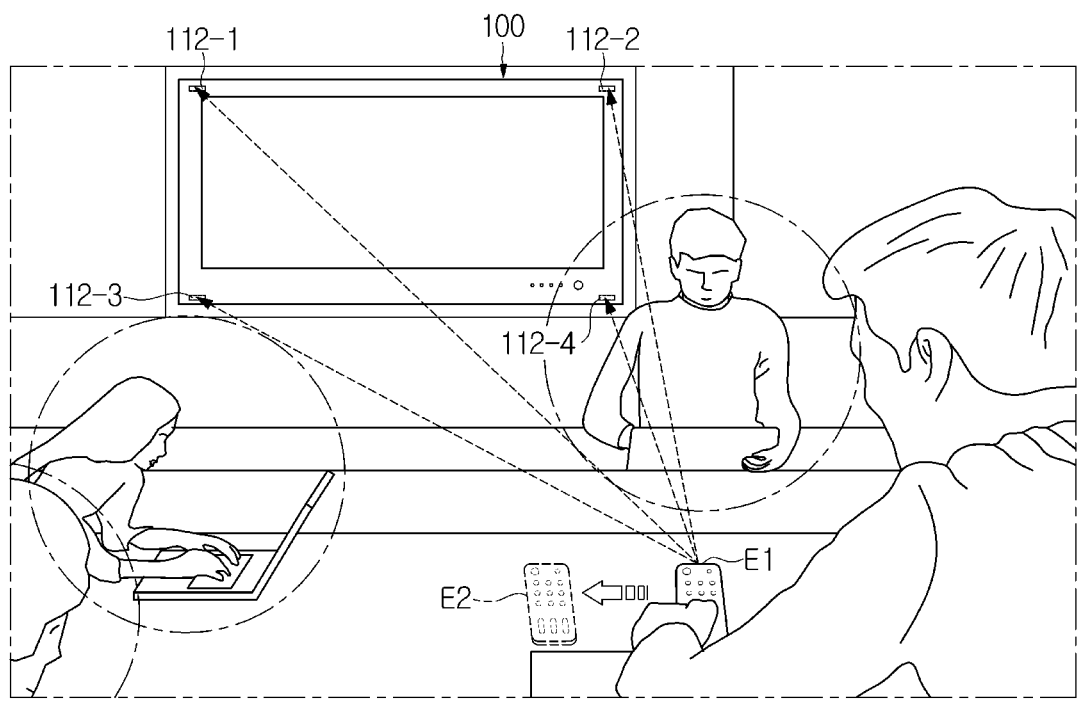
FIG. 9 is a view illustrating a method of deriving a position of an input device based on predicted position information and observed position information according to an embodiment.

FIG. 9 is a view illustrating a method of deriving a position of an input device based on predicted position information and observed position information according to an embodiment.

Referring to FIG. 9, the display apparatus may use a current position E1 and predicted position information E2 in determining the position of the input device O.

The predicted position information E2 is information about the position of the input device O after the current point of time that is derived by the controller 140 in consideration of a previous movement of the input device O.

The current position E1 is a position of the input device O derived based on the signal reflected from the input device O. In general, when a signal reflected from the input device O, which is used for observed position information E1, has little noise, the observed position may be determined as the position of the input device O. However, when there is a lot of noise in the signal reflected by the input device O from the surrounding object, the controller 140 may also use the predicted position information E2 generated by the controller 140, when determining the position of the input device O.

When the noise of the signal reflected from the input device O is small, the position of the input device O may be determined using the signal reflected back from the input device O again, but when the noise of the reflection signal is large, the position information may be determined as E2. Both the current position E1 and the predicted position information E2 may be used to determine the position of the input device O. In addition, the predicted position information and the observed position information may be assigned different weights based on the ratio of noise in the signal reflected from the input device O. In addition, according to an embodiment, a Kalman filter may be used to synthesize predicted position information and observed prediction information.

FIGS. 10 to 13 are flowcharts according to an embodiment of the disclosure.

Figure 10:
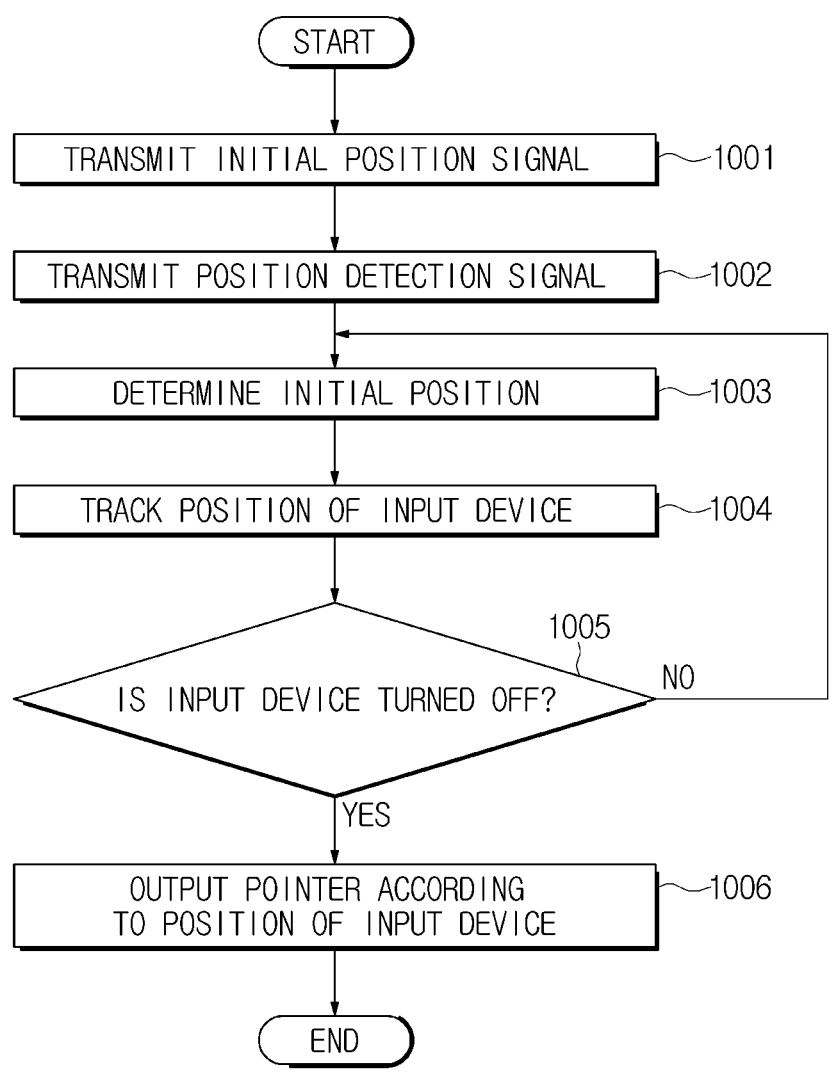
FIGS. 10, 11, 12, and 13 are flowcharts according to an embodiment of the disclosure.

Referring to FIG. 10, the input device O transmits an initial position signal (1001). The display apparatus transmits a position detection signal (1002). The start position of the input device O is determined based on the initial position signal (1003). The position of the input device O may be tracked based on a signal reflected from the input device O (1004). The input device O may be turned off to stop transmission of the initial position signal, and when the transmission of the initial position signal is resumed, the position of the start point of time may be redetermined (1005). The controller may output a pointer according to the position of the input device (1006).

Figure 11:
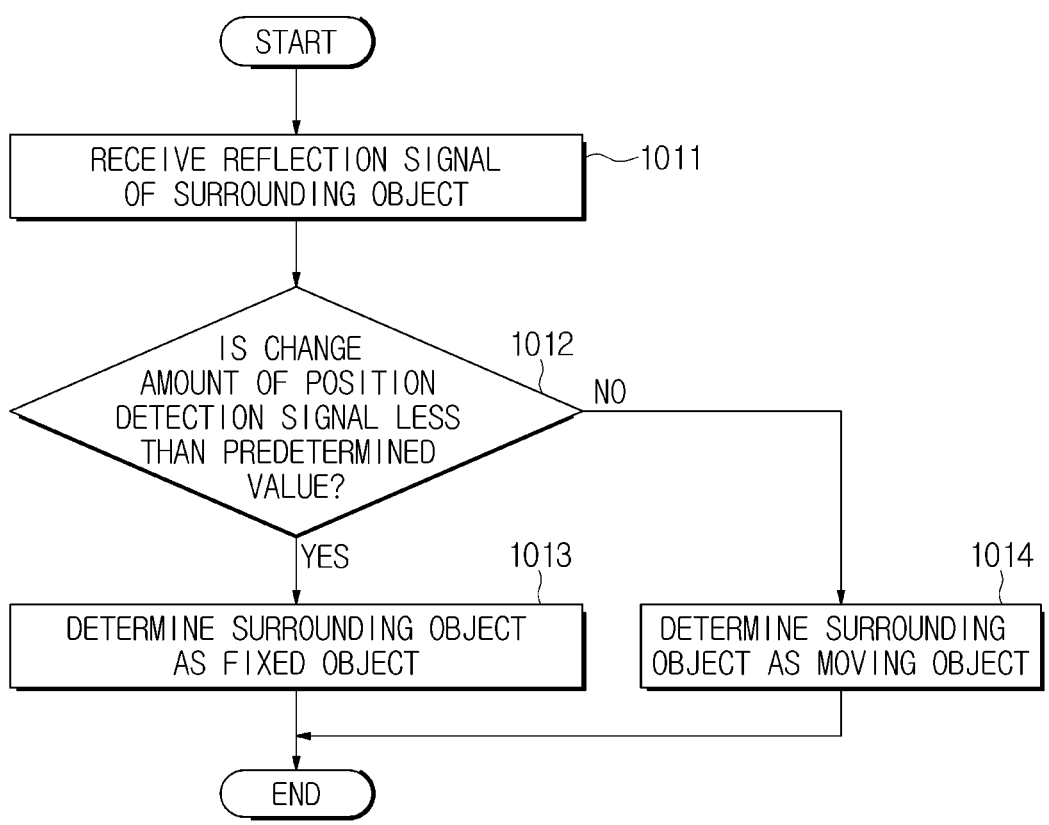

Referring to FIG. 11, the display apparatus may receive a reflection signal of a surrounding object (1011). The display apparatus derives the change amount of the received signal, and when the change amount of the received signal is less than a predetermined value (1012), determines the surrounding object as a fixed object (1013), and when the change amount exceeds the predetermined value, determines the surrounding object as a moving object (1014).

Figure 12:
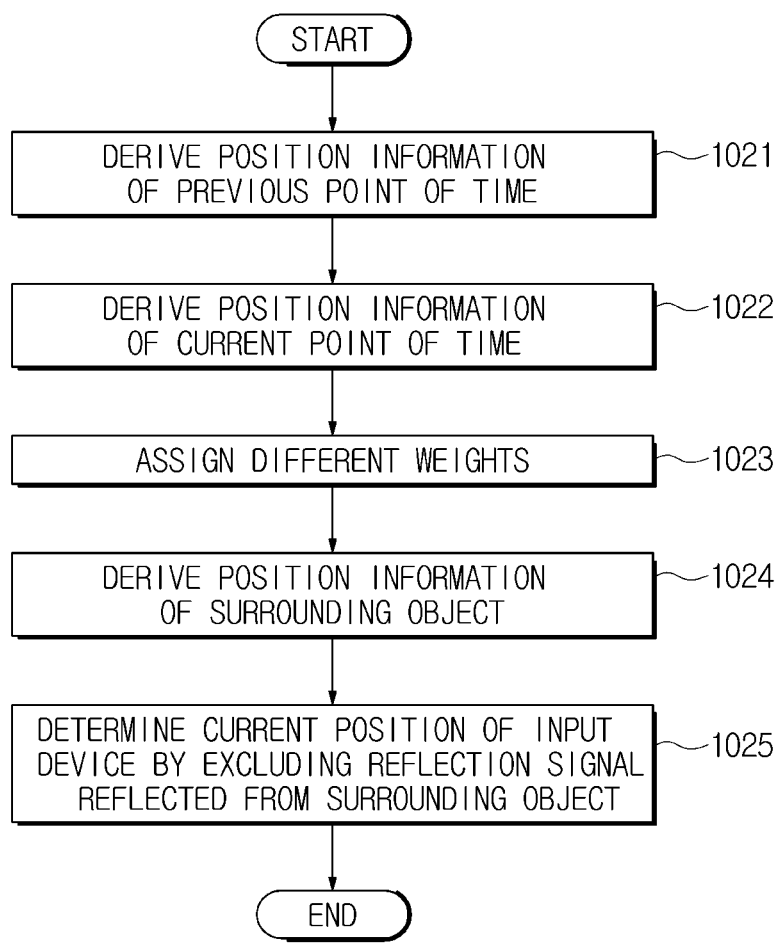

Referring to FIG. 12, the display apparatus derives position information of a previous point of time (1021), and derives position information of a current point of time (1022).

In addition, the position information of the previous point of time and the position information of the current point of time are assigned different weights (1023), and based on this, the position of the surrounding object at the current point of time may be derived (1024). Based on this, a reflection signal reflected from the surrounding object may be determined, and since the reflection signal reflected from the surrounding object is a signal acting as noise in determining the position of the input device, the current position of the input device may be determined by excluding the reflection signal reflected from the surrounding object (1025).

Figure 13:
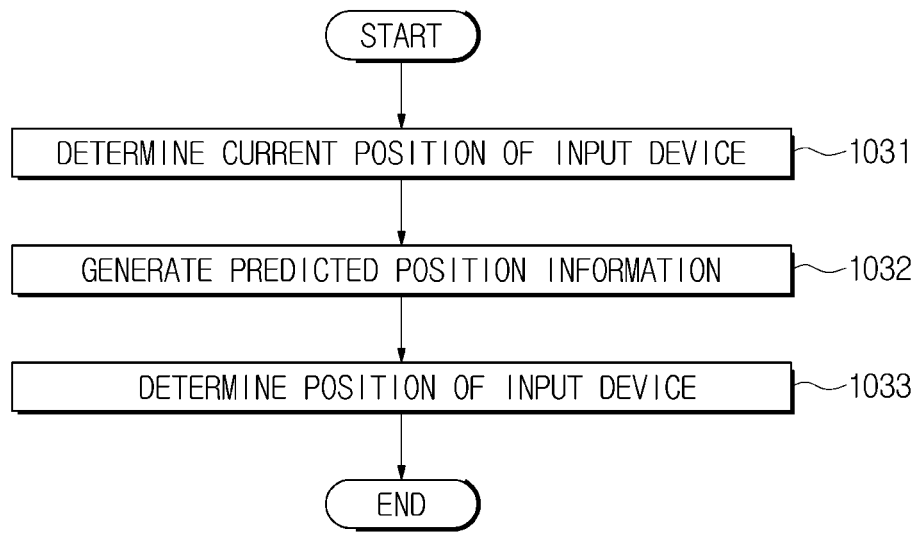

Referring to FIG. 13, the display apparatus may determine the current position of the input device (1031). The display apparatus may generate predicted position information (1032). The display apparatus may determine a new position of the input device based on the current position and the predicted position information (1033). However, based on noise caused by the surrounding object, observed position information and predicted position information are assigned different weights, so that the position of the input device at a new point of time may be determined.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A method of controlling a display system, the method comprising:
   transmitting, by an input device, an initial position signal in response to the input device being an on-state according to a user input, wherein the initial position signal is a radar signal having a predetermined magnitude;
   receiving, by a plurality of antenna modules, the initial position signal from the input device, and transmitting a position detection signal and receiving a reflection signal of the position detection signal that is reflected from the input device and a surrounding object;
   determining distances from the input device to each of the plurality of antenna modules based on a ratio of the predetermined magnitude of the initial position signal and a magnitude of the initial position signal received by each of the plurality of antenna modules;
   determining an initial position of the input device based on the determined distances;
   determining a current position of the input device by calculating distances to the input device from positions of the plurality of antenna modules based on the reflection signal reflected within a predetermined range of the initial position; and
   displaying a pointer on a display based on the current position of the input device,
   wherein the input device comprises a timer circuit to switch the input device to an off-mode to stop transmitting the initial position signal when a predetermined time has passed after the input device is switched to the on-state according to the user input.

2. A display system comprising:
   a display;
   an input device configured to transmit an initial position signal in response to being an on-state according to a user input, wherein the initial position signal is a radar signal having a predetermined magnitude:
   a plurality of antenna modules configured to transmit a position detection signal, receive a reflection signal of the position detection signal that is reflected from the input device and a surrounding object, and receive the initial position signal transmitted from the input device; and
   a controller configured to perform control to cause a pointer to be displayed on the display based on a position of the input device according to the received initial position signal and the reflection signal,
   wherein the controller is configured to:
      determine distances from the input device to each of the plurality of antenna modules based on a ratio of the predetermined magnitude of the initial position signal and a magnitude of the initial position signal received by each of the plurality of antenna modules:
      determine an initial position of the input device based on the determined distances; and
      determine a current position of the input device by calculating distances to the input device from positions of the plurality of antenna modules based on the reflection signal reflected within a predetermined range of the initial position, and wherein the input device comprises a timer circuit to switch the input device to an off-mode to stop transmitting the initial position signal when a predetermined time has passed after the input device is switched to the on-state according to the user input.

3. The display system of claim 2, wherein the controller is configured to determine the current position of the input device based on the reflection signal that has a signal magnitude whose change amount exceeds a reference value.

4. The display system of claim 1, wherein the input device is configured to transmit the initial position signal having a frequency band that matches a frequency band of the position detection signal.

5. The display system of claim 1, wherein the controller is configured to determine the current position of the input device based on a reflection signal excluding the reflection signal reflected from the surrounding object using a previous reflection signal received at a predetermined previous point of time and the reflection signal received at a current point of time.

6. The display system of claim 5, wherein the controller is configured to determine the current position of the input device by applying a first weight to the previous reflection signal and applying a second weight to the reflection signal.

7. The display system of claim 2, wherein the controller is configured to generate predicted position information based on reflection signals received from a predetermined previous point of time to a current point of time, and determine the current position of the input device based on the predicted position information and the reflection signal.

8. The display system of claim 2, wherein the controller is configured to stop determining the position of the input device when the position of the input device does not change for a predetermined period of time or a user switches the input device to be powered off.

9. A display apparatus comprising:

a display;

a plurality of antenna modules configured to transmit a position detection signal, receive a reflection signal of the position detection signal that is reflected from an input device and a surrounding object, and receive an initial position signal transmitted from the input device, wherein the initial position signal is a radar signal having a predetermined magnitude; and a controller configured to perform control to cause a pointer to be displayed on the display according to a current position of the input device determined based on the initial position signal and the reflection signal, wherein the controller is further configured to:

determine distances from the input device to each of the plurality of antenna modules based on a ratio of the predetermined magnitude of the initial position signal and a magnitude of the initial position signal received by each of the plurality of antenna modules;

determine an initial position of the input device based on the determined distances; and determine the current position of the input device by calculating distances to the input device from positions of the plurality of antenna modules based on the reflection signal reflected within a predetermined range of the initial position, wherein the input device is configured to transmit the initial position signal in response to being an on-state according to a user input, and the input device comprises a timer circuit to switch the input device to an off-mode to stop transmitting the initial position signal when a predetermined time has passed after the input device is switched to the on-state according to the user input.

* * * * *